United States Patent
Liu et al.

(10) Patent No.: US 6,576,694 B1
(45) Date of Patent: Jun. 10, 2003

(54) BLENDS OF CARBON DIOXIDE-PROPYLENE OXIDE COPOLYMER AND POLY (3-HYDROXYALKANOATE) AND A METHOD OF MAKING THE SAME

(75) Inventors: Jingjiang Liu, Changchun (CN); Chunrong Sun, Changchun (CN)

(73) Assignee: Changchun Institute of Applied Chemistry Chinese Academy of Science, Changchun (CN)

( * ) Notice: Subject to any disclaimer, the term of this patent is extended or adjusted under 35 U.S.C. 154(b) by 0 days.

(21) Appl. No.: 10/166,136

(22) Filed: Jun. 10, 2002

(30) Foreign Application Priority Data

Mar. 4, 2002 (CN) ........................................ 02104275 A

(51) Int. Cl.$^7$ ............................. C08K 5/09; C08K 3/38; C08K 3/34
(52) U.S. Cl. ........................ 524/291; 524/451; 524/404
(58) Field of Search ................................ 524/291, 404, 524/451

(56) References Cited

U.S. PATENT DOCUMENTS

| | | | |
|---|---|---|---|
| 4,603,070 A | | 7/1986 | Steel et al. |
| 4,912,149 A | | 3/1990 | Robeson et al. |
| 5,462,983 A | * | 10/1995 | Bloembergen et al. ....... 524/51 |
| 5,502,116 A | | 3/1996 | Noda |
| 6,077,931 A | | 6/2000 | Noda |
| 6,127,512 A | * | 10/2000 | Asvar et al. ................. 528/272 |

FOREIGN PATENT DOCUMENTS

| | | |
|---|---|---|
| CN | 91105618 | 8/1991 |
| CN | 1257753 | 6/2000 |
| CN | 1257885 | 6/2000 |

OTHER PUBLICATIONS

Inoue, et al. (1969) *Copolymerization of Carbon Dioxide and Epoxide*. Journal of Polymer Science, Polymer Letter Edition 7, pp. 287–292.

Immirzi, et al. (1999) *Blends of Biodegradable Polyesters by Reactive Blending: Preparation, Characterisation and Properties*. J. Mater. Sci. 34, pp. 1625–1639.

Avella, M., et al. (2000) *Preparation of PHBV/Starch Blends by Reactive Blending and their Characterization*. J. Appl. Polym. Sci. 77(1) pp. 232–236.

Cyras, et al. (1999) *Biodegradable Films from PHB–8HV Copolymers and Polyalcohols Blends: Crystallinity, Dynamic Mechanical Analysis and Tensile Properties*. Polymer International 48, pp. 705–712.

Park, et al. (2001) *Viscoelasticity of Biodegradable Polymer Blends of Poly(3–Hydroxybutyrate and Poly(ethylene Oxide)*. Polymer 42, pp. 5737–5742.

* cited by examiner

*Primary Examiner*—Kriellion A. Sanders
(74) *Attorney, Agent, or Firm*—Knobbe, Martens Olson & Bear LLP

(57) ABSTRACT

The present invention provides blends comprising 30–70 parts by weight of poly(3-hydroxyalkanoate) (PHA) resin, 70–30 parts by weight of higher molecular weight carbon dioxide-propylene oxide copolymers (PPC) with over 98% alternating copolymer structure, 1–10 parts by weight of talcum powder, 0.2–3 parts by weight of boron nitride, and 0.1–2 parts by weight antioxidant(s), where the sum of parts of PHA and PPC is 100 parts by weight. The present invention also provides for a method of preparing the blends, which may comprise the step of extrusion and pelletization in a conventional twin-screw extruder. The melt mass in the twin-screw extruder is kept in the range of 175° C.–185° C. The blends can be used in extrusion of plates and sheets, preparation of films and in injection molding. These fabricated articles possess biodegradable property, good mechanical properties, good printing property, good barrier property and sealing property.

12 Claims, No Drawings

BLENDS OF CARBON DIOXIDE-PROPYLENE OXIDE COPOLYMER AND POLY (3-HYDROXYALKANOATE) AND A METHOD OF MAKING THE SAME

FIELD OF THE INVENTION

The present invention relates to blends of carbon dioxide-propylene oxide copolymer and poly(3-hydroxyalkanoate) and a method of making the same.

BACKGROUND OF THE INVENTION

Carbon dioxide-propylene oxide copolymer (PPC) and poly(3-hydroxyalkanoate) (PHA) are completely biodegradable polymer materials. One of the main raw materials for synthesizing PPC is carbon dioxide produced in many industrial plants as an exhaust gas. Their exhaustion to the atmosphere not only causes pollution to the environment but also commits a waste of carbon resource. Through the synthesis of PPC, fixation of $CO_2$ resources could be achieved. This could provide a new carbon resource to partly alleviate the shortage of petrochemical raw materials and could at the same time protect the environment for the mankind. On the other side, since PPC possesses the characteristics of complete biodegradation, its use to substitute the non-biodegradable common plastics will have important meaning in solving the problem of "white pollution". Therefore the present invention will have dual functions on environment protection. Carbon dioxide-propylene oxide copolymers are a kind of colorless and transparent solid. They are non-poisonous, tasteless and possess good barrier property, printing property as well as sealing property. They are especially suitable for the manufacture of disposal packaging materials for pharmaceuticals and foodstuff. Ever since Japanese scientists S. Inoue, H. Koinuma and T. Tsuruta disclosed and published this technology in Journal of Polymer Science, Polymer Letter Edition 7, 287 (1969) in the year of 1969, attentions from scientists worldwide were drawn to this result. Large amount of research and development works have been done. In China, Xiaojiang Zhao, Binyuan Liu, Xianhong Wang, Daqing Zhao and Fusong Wang et al have successively applied Chinese patents entitled "Method of making aliphatic polycarbonate with high molecular weight" (Chinese Patent 1,257,885A) and "Method of making rare earth composite catalyst" (Chinese Patent 1,257,753). However, PPC has a glass transition temperature of 37° C. When temperature exceeds 37° C., carbon dioxide-propylene oxide copolymers with alternating copolymer structure over 98% will turn into rubbery material. Their tensile strength, Young's modulus and flexural modulus will greatly be reduced and will lose the properties that a plastics material should have. Yet from another point of view, such rubbery PPC, especially those with higher degree of chain entanglement, is an excellent elastomer possessing very excellent toughness and therefore could be a good toughening agent for brittle polymeric materials.

Although PPC with low molecular weight has identical chemical composition to that of higher molecular weight PPC, its mechanical strength is much lower. Due to its lower molecular weight, the relative content of end group in the macromolecule increases, leading to an increase of the probability of an occurrence of zippering degradation induced by end group and thus a lowering of thermal stability. Since low molecular weight PPC does not possess the necessary mechanical properties of a plastics material, it could only be used as an additive for rubber.

In order to improve the properties of PPC, Robenson et al blended PPC with polyvinyl acetate and obtained a polyblend whose strength was twice that of PPC (L. M. Robenson, J. A. Kuphal, 1990 U.S. Pat. No. 4,912,149). When PPC was blended with acrylonitrile-butadiene rubber (NBR), the crosslinked polymer blend was formed with the initiators consisting of dicumyl peroxide (DCP) and triallyl isocyanurate (TAIC), or DCP and maleic anhydride, then the polymer blend was turned into an elastomer of interpenetrating polymer network (IPN). This elastomer not only retained the good oil resisting property of acrylonitrile-butadiene rubber(NBR), but also significantly improved the mechanical properties. The thermooxidative stability of the elastomer was also excellent (Xianghong Yang, Yuhui Huang, Shulu Zhao et al, ZL91, 105, 618, 1, 1991). The properties of PPC were improved to a certain extent by the above-mentioned method of modification. The completely biodegradable characteristics of the material, however, were lost, leading to significant lowering of the environmental benefit.

PHA is also a kind of completely biodegradable polymer material. They could be prepared by biological fermentation of carbon resource materials such as glucose and propionic acid. These raw materials are a kind of renewable resources and as a kind of plastics they have important meaning on the alleviating of the petroleum resource shortage and on the realization of continued development of economy. Just like PPC, they are meaningful in solving the problem of "white pollution". Since Lemoigne disclosed the technology of preparation of poly(3-hydroxyl butyrate) (PHB) in 1925 [M. Lemoigne, Ann. Inst. Pasteur (Paris), 1925, 39, 144–173.], attentions of scientists worldwide were drawn to it. Researches on PHB were developed to those of 3-hydroxylbutytate-3-hydroxyl valerate copolymers (PHBV) and other copolymers of PHA series. Large amount of patents were published such as U.S. Pat. No. 6,077,931 (Jun. 20, 2000), U.S. Pat. No. 4,603,070 (Jan. 1, 1986), U.S. Pat. No. 5,502,116 (March 1996) etc.

PHBV are a kind of thermoplastic and crystalline polymer. Their main shortcomings are relatively narrow temperature window of processing and easiness of decomposition and degradation. They are also a kind of brittle polymer materials with fairly low impact strength and relatively low elongation at break. In addition, in the course of processing, crystallinity increases on standing due to their relatively low rate of crystallization. Large spherulite thus formed can become a center of stress concentration. Owing to their high crystallinity, the amorphous part between spherulite sustains very high stress leading to possible breakage of the fabricated article along these regions. Due to slow crystallization rate, a film made from PHBV will stick to itself during film forming on cooling and the sticked parts are difficult to be separated off. The third drawback is their relatively low melt strength. All these disadvantages make PHB and PHBV very difficult to be processed into films. In order to improve these properties, scientists carried out a series of research and exploratory works. For example, B. Immirzi et al blended PHBV with polycaprolactone (PCL) to improve the properties of PHBV and studied in detail the effects of dicumyl peroxide (DCP) on the properties of PHBV/PCL blends [J. Mater. Sci. 1999, 34, 1625–1639]. M. Avella et al studied the properties of PHBV/starch reacted blends [J. Appl. Polym. Science, 2000, 77(1), 232–236]. Cyras et al studied the properties of PHBV/polyols blend system [Polymer International, 1999, 48, 705–712]. Park et al studied the properties of PHB/polyethylene blend [Polymer, 2001, 42, 5737–5742]. These works contribute to improve the properties of PHBV and to lower the cost of the preparation respectively, but there are still some problems to be solved. For example, the price of PCL is rather high and its effect on the toughness improvement of PHBV is unsatisfactory. Although the price of starch is low but nearly no improvements of toughness and main mechanical properties of PHBV could be achieved. Polyhydric alcohol polymer and polyoxyethylene although could improve the toughness of PHBV to a certain extent, yet the improvement is not sufficient. In addition, they are not biodegradable polymers. Their participation will lead to loss of completely biodegradable characteristics of the material.

SUMMARY OF THE INVENTION

One objective of the present invention is to provide blends of carbon dioxide-propylene oxide copolymer and poly(3-hydroxyalkanoate).

Another objective of the present invention is to provide a method of making said blends of carbon dioxide-propylene oxide copolymer and poly(3-hydroxyalkanoate).

DETAILED DESCRIPTION OF THE INVENTION

One objective of the present invention is to provide blends of carbon dioxide-propylene oxide copolymer and poly(3-hydroxyalkanoate). The said blends comprise the following components:

(i) 30–70 parts by weight of poly(3-hydroxyalkanoate) (PHA) resin, (ii) 70–30 parts by weight of high molecular weight Carbon dioxide-propylene oxide copolymers (PPC) with over 98% alternating copolymer structure, (iii) 1–10 parts by weight of talcum powder, (iv) 0.2–3 part by weight of boron nitride, and (v) 0.1–2 part by weight of antioxidant(s), wherein the sum of parts of PHA and PPC is 100 parts by weight.

The examples of PHA useful in the present invention comprise, but not limit to, 3-hydroxyl butyrate homopolymer (PHB) and 3-hydroxyl butytate-3-hydroxyl valerate copolymer (PHBV). PHB could be considered as a special example of PHBV copolymer series, i.e. the case when the content of 3-hydroxyl valerate in PHBV copolymer is zero. The content of 3-hydroxyl valerate (HV) in PHBV is preferably in a range of 0–17 wt %. In this copolymer series, when the HV content increases, the melting points of crystals decrease, the crystallinity decreases and no poly(3-hydroxyl valerate) (PHV) crystal could be detected. In mechanical properties, when the content of HV increases, stiffness decreases, toughness increases and elongation at break increases. If the content of HV in PHBV copolymer excesses 17 wt %, therefore, the blends according to the present invention will not possess sufficient stiffness and mechanical strength. The PHA useful in the present invention may be made by any methods known by the skilled persons in the art.

The blends of the present invention could comprise talcum powder and boron nitride as nucleating agents for PHBV. The average particle size of talcum powder may be, for example, 1–5 $\mu$m. The amount of talcum powder used in the said blends may be about 1–10 wt %, preferably 2–7 wt %, based on weight of PHBV and PPC. The average particle size of boron nitride may be, for example, 30–50 nm. The amount of boron nitride used in the said blends may be about 0.2–3 wt %, preferably 0.5–2 wt %, based on weight of PHBV and PPC. They could significantly increase the crystallization rate of PHBV, reduce the size of the spherulite and thus prevent the fabricated articles from becoming sticky.

Carbon dioxide-propylene oxide copolymers (PPC) useful in the present invention are a kind of high molecular weight material, which are known material in the art. One example of PPC useful in the present invention is synthesized by the use of method and catalyst described in Chinese patents 1,257,753 and 1,257,885A. Their number average molecular weights, $M_n$, are in the range of 40,000–140,000 g/mole, molecular weight distribution index, $M_w/M_n$, are in the range of 3.0–5.0. In addition, these PPC copolymers could be end capped and thermally stabilized by suitable techniques, thereby their thermal stabilities increased appreciably. Their thermal degradation temperature (in air atmosphere) is in the range of 200–220° C. which could mostly keep PPC from being degraded or decomposed under the PHBV processing temperature.

The blends according to the present invention could comprise any antioxidant(s) known in the art, such as, but not limited to, hindered phenol. A preferable antioxidant is tetra[β-(3,5-ditertiary butyl-4-hydroxyl phenyl)propionic acid]pentaerythritol (antioxidant ky-7910). The amount of antioxidant(s) used in the said blends may be about 0.1–2 wt %, preferably 0.5–1 wt %, based on weight of PHBV and PPC.

In a preferable embodiment of the present invention, the blend of carbon dioxide-propylene oxide copolymer and poly(3-hydroxyalkanoate) has the following composition: 30–70 parts by weight of PHBV resin with HV content in the range of 0–17 wt %, 70–30 parts by weight of high molecular weight PPC with over 98% alternating copolymer structure, 2–7 parts by weight of talcum powder, 0.5–2 part by weight of boron nitride, 0.5–1 part by weight of tetra [β-(3,5-ditertiary butyl-4-hydroxyl phenyl)propionic acid] pentaerythritol (antioxidant ky-7910), wherein the sum of parts of PHA and PPC is 100 parts by weight.

Furthermore, the blends according to the present invention could comprise other additives usually used in the art, such as pigment, dye, brightener, strengthening agent, germicide, fungicide, antistatic agent, filler, etc.

The present invention also provides a method of making said blends of carbon dioxide-propylene oxide copolymer and poly(3-hydroxyalkanoate). In principle, the said blends can be prepared by any method, which can equably mix the components of the blends, known in the art, such as, twin-screw extruder, single-screw extruder, etc. In a preferable embodiment of the present invention, the extrusion and pelletization of the blends were performed in a conventional twin-screw extruder. The melt material in the twin-screw extruder was kept in the temperature range of 175° C.–185° C. to ensure complete melting of PHBV. In order to evaluating the blends, the resulting blend pellets were then hot pressed at 175° C. and 10 MPa into plate with thickness of 1.5 mm. The plates were cut into dumbbell shape samples with 20 mm in length and 6 mm in width. The mechanical properties measured for these samples with different compositions are: tensile yield strength 32.8–20.3 MPa, tensile modulus 957–606 MPa, elongation at break 59–9%, energy absorption 595–190 mJ.

Since PHBV may reinforce PPC while PPC may toughen PHBV, the blends could have a comprehensive balance of good mechanical property, printing property, barrier property, processing property and biodegradable property. The blend pellets could be used in extrusion of plates and sheets, preparation of films and injection molding.

EMBODIMENTS OF THE INVENTION

The present invention will be described more details by referring the following examples.

EXAMPLE 1

30 parts by weight of PPC ($M_n$=60,000 g/mol, $M_w/M_n$=4.5), 70 parts by weight of PHBV (content of HV in PHBV is 17 wt %), 5 parts by weight of talcum powder having an average particle size of 5 μm, 1 part by weight of boron nitride having an average particle size of 30 nm, and 0.5 part by weight of tetra[β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 20.3 MPa, tensile modulus of 606 MPa, elongation at break of 59% and energy absorption of 595 mJ.

EXAMPLE 2

70 parts by weight of PPC ($M_n$=140,000 g/mol, $M_w/M_n$=5.0), 30 parts by weight of PHBV (content of HV in PHBV is 0 wt %, i.e.PHB), 5 parts by weight of talcum powder having an average particle size of 1 μm, 1 part by weight of boron nitride having an average particle size of 50 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 31.0 MPa, tensile modulus of 871 MPa, elongation at break of 14% and energy absorption of 350 mJ.

EXAMPLE 3

30 parts by weight of PPC ($M_n$=96,000 g/mol, $M_w/M_n$=3.9), 70 parts by weight of PHBV (content of HV in PHBV is 17 wt %), 5 parts by weight of talcum powder having an average particle size of 3 μm, 1 part by weight of boron nitride having an average particle size of 40 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 28.6 MPa, tensile modulus of 751 MPa, elongation at break of 23% and energy absorption of 280 mJ.

EXAMPLE 4

30 parts by weight of PPC ($M_n$=60,000 g/mol, $M_w/M_n$=4.5), 70 parts by weight of PHBV (content of HV in PHBV is 0 wt %, i.e. PHB), 5 parts by weight of talcum powder having an average particle size of 4 μm, 1 part by weight of boron nitride having an average particle size of 30 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 32.8 MPa, tensile modulus of 957 MPa, elongation at break of 9% and energy absorption of 190 mJ.

EXAMPLE 5

50 parts by weight of PPC ($M_n$=40,000 g/mol, $M_w/M_n$=3.0), 50 parts by weight of PHBV (content of HV in PHBV is 17 wt %), 5 parts by weight of talcum powder having an average particle size of 2 μm, 1 part by weight of boron nitride having an average particle size of 50 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 23.9 MPa, tensile modulus of 730 MPa, elongation at break of 28% and energy absorption of 310 mJ.

EXAMPLE 6

50 parts by weight of PPC ($M_n$=140,000 g/mol, $M_w/M_n$=5.0), 50 parts by weight of PHBV (content of HV in PHBV is 0 wt %, i.e. PHB), 5 parts by weight of talcum powder having an average particle size of 5 μm, 1 part by weight of boron nitride having an average particle size of 30 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 31.9 MPa, tensile modulus of 884 MPa, elongation at break of 11% and energy absorption of 205 mJ.

EXAMPLE 7

50 parts by weight of PPC ($M_n$=92,000 g/mol, $M_w/M_n$=3.8), 50 parts by weight of PHBV (content of HV in PHBV is 6.6 wt %), 5 parts by weight of talcum powder having an average particle size of 1 μm, 1 part by weight of boron nitride having an average particle size of 50 nm, and 0.5 part by weight of tetra [β-(3,5-ditertiary butyl-4-hydroxyl phenyl)propionic acid] pentaerythritol (antioxidant ky-7910) were mixed thoroughly in a high speed mixer. The mixed blend was extruded in a twin-screw extruder, pelletized and hot pressed into a plate. The plate has tensile yield strength of 29.6 MPa, tensile modulus of 788 MPa, elongation at break of 13% and energy absorption of 227 mJ.

What is claimed:

1. A blend of carbon dioxide-propylene oxide copolymer and poly(3-hydroxyalkanoate), comprising the following components:
   (i) 30–70 parts by weight of poly(3-hydroxyalkanoate) (PHA) resin,
   (ii) 70–30 parts by weight of high molecular weight carbon dioxide-propylene oxide copolymers (PPC) with over 98% alternating copolymer structure,
   (iii) 1–10 parts by weight of talcum powder,
   (iv) 0.2–3 part by weight of boron nitride, and
   (v) 0.1–2 part by weight of antioxidant(s),
   wherein the sum of parts of PHA and PPC is 100 parts by weight.

2. A blend of carbon dioxide-propylene oxide copolymer and poly(3-hydroxyalkanoate), comprising the following compositions:
   (i) 30–70 parts by weight of 3-hydroxyl butyrate-3-hydroxyl valerate copolymer (PHBV) resin with 3-hydroxyl valerate content in the range of 0–17 wt %,
   (ii) 70–30 parts by weight of high molecular weight carbon dioxide-propylene oxide copolymer (PPC) having over 98% alternating copolymerization structure,
   (iii) 2–7 parts by weight of talcum powder,
   (iv) 0.5–2 part by weight of boron nitride, and (v) 0.5–1 part by weight of tetra [β-(3,5-ditertiary butyl-4-hydroxyl phenyl)propionic acid] pentaerythritol, wherein the sum of parts of PHBV and PPC is 100 parts by weight.

3. The blend of carbon dioxide-propylene oxide copolymer and poly(3-hydroxyalkanoate) according to claim 1, wherein said carbon dioxide-propylene oxide copolymer has $M_n$ in the range of 40,000–140,000, $M_w/M_n$ in the range of 3.0–5.0.

4. The blend of carbon dioxide-propylene oxide copolymer and poly(3-hydroxyalkanoate) according to claim 2, wherein said carbon dioxide-propylene oxide copolymer has $M_n$ in the range of 40,000–140,000, $M_w/M_n$ in the range of 3.0–5.0.

5. The blend of carbon dioxide-propylene oxide copolymer and poly(3-hydroxyalkanoate) according to claim 1, wherein said carbon dioxide-propylene oxide copolymer is polymers that have been end-capped and thermal stabilized, and their thermal degradation temperature is in the range of 200° C.–220° C.

6. The blend of carbon dioxide-propylene oxide copolymer and poly(3-hydroxyalkanoate) according to claim 2, wherein said carbon dioxide-propylene oxide copolymer is polymers that have been end-capped and thermal stabilized, and their thermal degradation temperature is in the range of 200° C.–220° C.

7. The blend of carbon dioxide-propylene oxide copolymer and poly(3-hydroxyalkanoate) according to claim 1, wherein said talcum powder has an average particle size of 1–5 μm.

8. The blend of carbon dioxide-propylene oxide copolymer and poly(3-hydroxyalkanoate) according to claim 2, wherein said talcum powder has an average particle size of 1–5 μm.

9. The blend of carbon dioxide-propylene oxide copolymer and poly(3-hydroxyalkanoate) according to claim 1, wherein said boron nitride has an average particle size of 30–50 nm.

10. The blend of carbon dioxide-propylene oxide copolymer and poly(3-hydroxyalkanoate) according to claim 2, wherein said boron nitride has an average particle size of 30–50 nm.

11. The method of preparation for the blends of carbon dioxide-propylene oxide copolymer and poly(3-hydroxyalkanoate) according to any one of the preceding claims, comprising the step of extrusion and pelletization in a twin-screw extruder.

12. The method according to claim 11, wherein the melt mass in the twin-screw extruder is kept in the temperature range of 175° C.–185° C.

* * * * *